United States Patent [19]
Asbell et al.

[11] Patent Number: 5,300,934
[45] Date of Patent: Apr. 5, 1994

[54] RADAR ALTIMETER LOOP SIMULATOR

[75] Inventors: Vernon L. Asbell, Haltom City; Kevin P. Nelms, Fort Worth, both of Tex.

[73] Assignee: Fieldtech Avionics & Instruments, Inc., Fort Worth, Tex.

[21] Appl. No.: 937,360

[22] Filed: Aug. 27, 1992

[51] Int. Cl.⁵ ............................................. G01S 7/40
[52] U.S. Cl. ............................................. 342/172
[58] Field of Search ............................................. 342/172

[56] References Cited
U.S. PATENT DOCUMENTS

| | | |
|---|---|---|
| 3,169,244 | 2/1965 | Scribner et al. |
| 3,641,574 | 2/1972 | Douglas |
| 4,121,213 | 10/1978 | Bush et al. ............ 342/172 |
| 4,168,502 | 9/1979 | Susie |
| 4,319,247 | 3/1982 | Warren ............ 342/172 |
| 4,661,818 | 4/1987 | Riffiod et al. ............ 342/172 |
| 4,679,049 | 7/1987 | Riffiod ............ 342/172 |
| 4,683,473 | 7/1987 | Haugland ............ 342/172 |
| 5,005,017 | 4/1991 | Sikora ............ 342/172 |
| 5,117,230 | 5/1992 | Wedel ............ 342/169 |
| 5,138,325 | 8/1992 | Koury ............ 342/172 X |
| 5,177,488 | 1/1993 | Wang et al. ............ 342/172 X |

*Primary Examiner*—T. H. Tubbesing
*Attorney, Agent, or Firm*—Felsman, Bradley, Gunter & Dillon

[57] ABSTRACT

A loop simulator is provided for testing radar altimeter systems. Several accurately calibrated delay lines and attenuation elements can be switched into and out of the signal path. Using these elements, the loop simulator can be configured to provide several common tests for radar altimeters. Switching of the various elements is controlled by a microprocessor, which determines the appropriate configuration based upon a mode input, and automatically switches the correct elements into the signal path. The controller automatically compensates for attenuation of the various elements.

16 Claims, 4 Drawing Sheets

RADAR ALTIMETER LOOP SIMULATOR

BACKGROUND OF THE INVENTION

1. Field of the Invention

The present invention relates in general to radar test equipment, and in particular to a radar altimeter loop simulator. Still more particularly, the present invention relates to a testing system for simulating time delay and signal attenuation associated with multiple test conditions.

2. Description of the Prior Art

The typical radar altimeter contains a transmitter which sends out RF energy via an antenna which is bounced off the surface of the earth and returns to a receiver in the radar altimeter. Such altimeters typically use either pulse or continuous wave signals to determine altitude. The receiver uses the returned RF signal to measure the time delay between the transmitted signal and the associated return signal arriving at the receiver, and calculates the altitude of the radar altimeter with respect to the earth.

To facilitate ground testing of the altimeter for calibration or trouble-shooting, the output of the altimeter is coupled to an altitude loop simulator via a cable. The simulator includes a plurality of delay lines which simulate different altitudes. The altimeter output is coupled to one of these delay lines through manual switching of the signal path. The delayed signal is then coupled back into the receiver. Other simulations such as direct antenna leakage and open loop signals are performed by switching signal attenuation elements and signal terminations within the test fixture. An example of such a test device is the Sperry Radio Altimeter Test Set, part number T322967.

Precise calibration of radar equipment such as radar altimeters requires the delay lines to be carefully tailored, thus adding significantly to their cost. Also, each individual delay line must be calibrated in order to determine its attenuation if altimeter sensitivity is to be measured.

Depending upon the specific manufacturer's test procedure and on the particular test desired, various delay lines, terminations, and attenuations must be manually switched into the simulator loop path. The overall attenuation of the various elements is usually not known, so that altimeter sensitivity cannot be accurately determined.

It would be desirable to provide a loop simulator for testing radar altimeters which can be easily reconfigured to allow various tests to be performed. It would be further desirable to provide such a simulator which can be used with either pulse modulated or continuous wave radar altimeters.

SUMMARY OF THE INVENTION

Therefore, in accordance with the present invention, a loop simulator is provided for testing radar altimeter systems. Several accurately calibrated delay lines and attenuation elements can be switched into and out of the signal path. Using these elements, the loop simulator can be configured to provide several common tests for radar altimeters. Switching of the various elements is controlled by a microprocessor, which determines the appropriate configuration based upon a mode input, and automatically switches the correct elements into the signal path. The controller automatically compensates for attenuation of the various elements.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
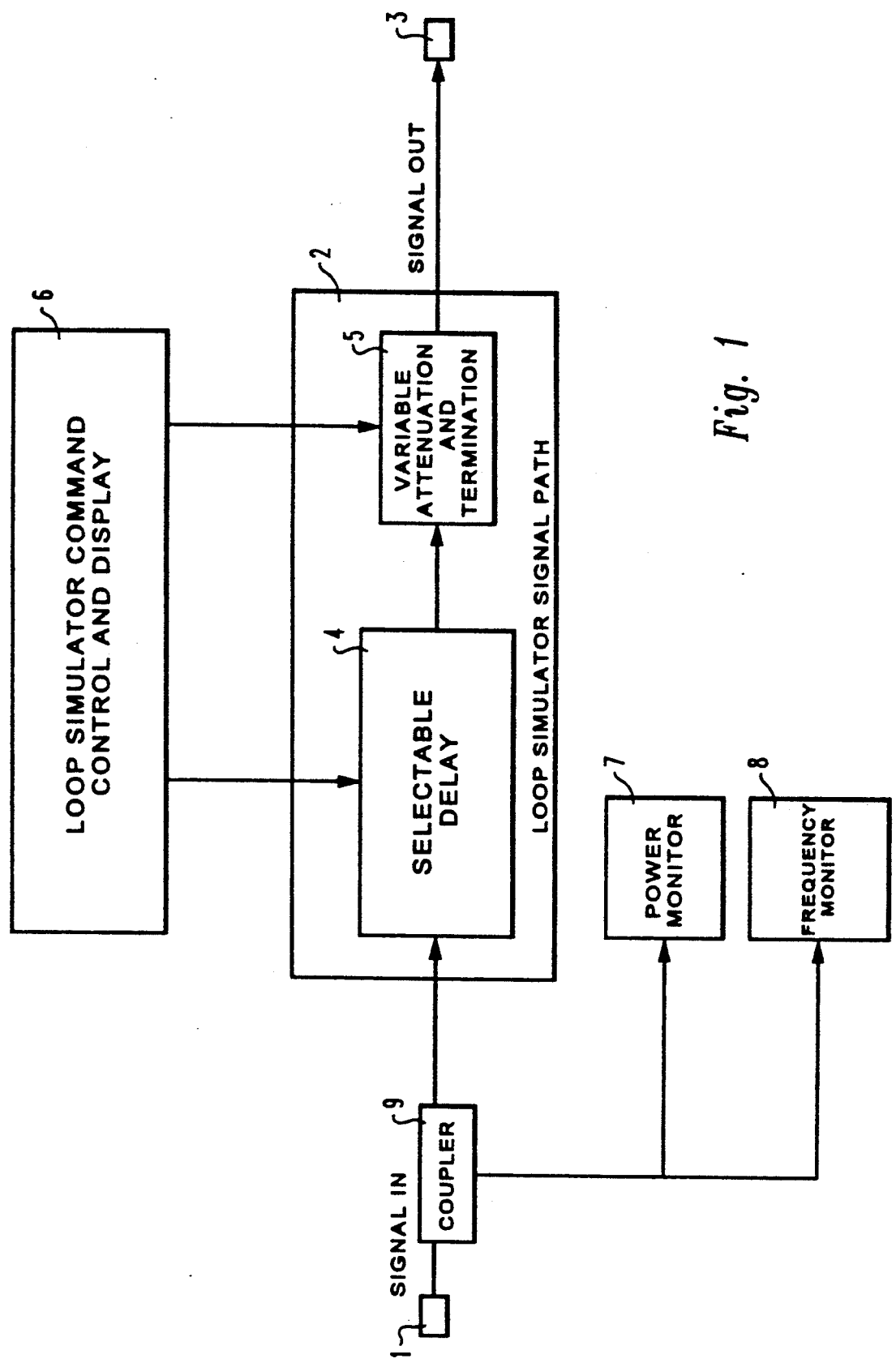
FIG. 1 is a high-level block diagram depicting the relationship between the major components comprising a system in accordance with a preferred embodiment of the present invention.

With reference now to the figures and in particular with reference to FIG. 1, there is depicted a high-level block diagram of the major components which comprise the loop simulator of the present invention. The transmitter output signal is input into the loop simulator at connector 1. The signal passes through loop simulator signal path 2 and is coupled to the receiver of the radar altimeter being tested at connector 3. The delay of the signal passing through the loop simulator signal path is determined by selectable delay 4. The delay selected will equal the time delay that elapses when a radar signal is transmitted from a radar altimeter, travels to the earth's surface, reflects, and returns back to the receiver of the altimeter. This time delay corresponds to a specific altitude. The test signal also passes through variable attenuation and termination 5 which simulates the power loss that occurs when the signal passes through the atmosphere and reflects off the ground.

The configuration of loop simulator signal path 2 is controlled by loop simulator control and display unit 6 which receives a command from the user to enter into a desired test mode. Loop simulator control and display 6 will control selectable delay 4 and variable attenuation and termination 5 to create a signal path which corresponds to the required configuration for the desired test mode.

Power monitor 7 and frequency monitor 8 receive an input from the transmitted test signal through coupler 9 in order to display test signal power and frequency. Power monitor 7 samples the signal to determine the signal's power and displays the resulting value on a display. Frequency monitor s measures the signal to determine the signal's frequency and displays this value.

Figure 2:
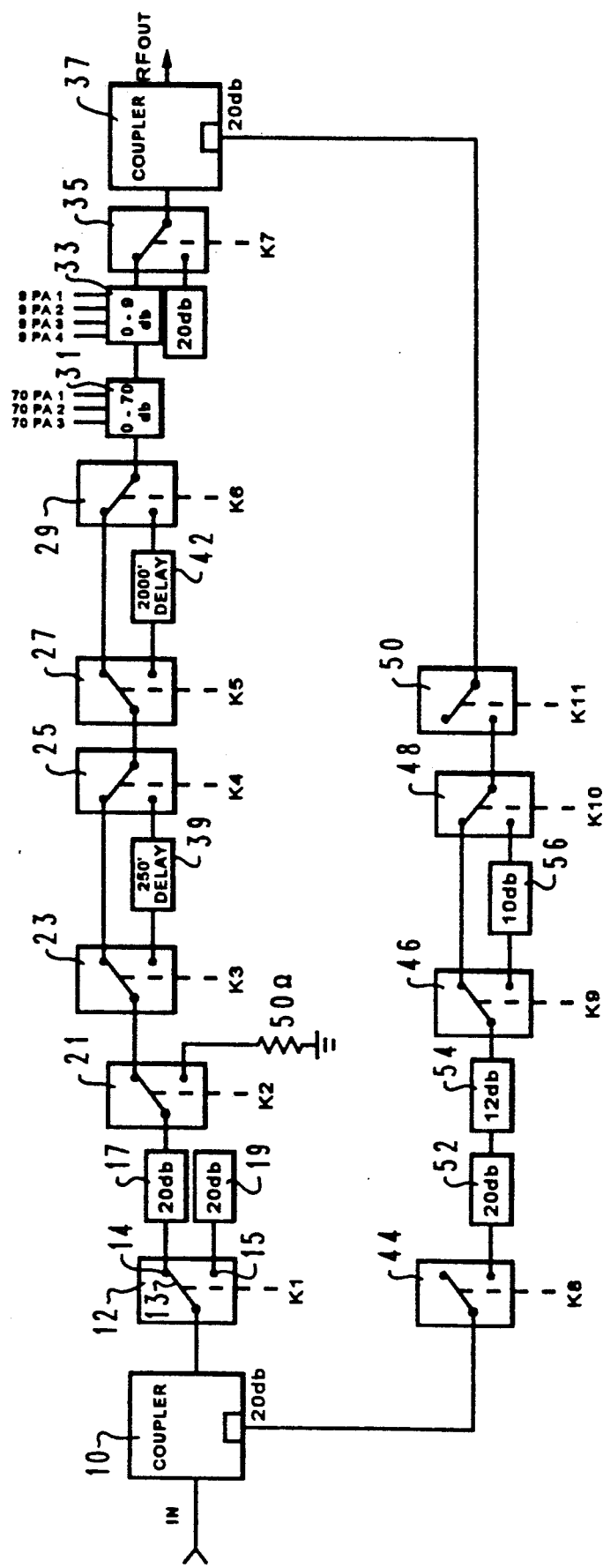
FIG. 2 is a schematic diagram of the loop simulator signal path as described in a preferred embodiment of the present invention.

Referring now to FIG. 2, there is illustrated a schematic diagram of the loop simulator signal path 2. The signal path contains attenuation elements and delay elements which may be brought in and out of the series signal path through interconnecting switches. Various combinations of the attenuation elements and delay elements correspond to specific tests commonly used by manufacturers of radar altimeters. However, those skilled in the art will appreciate that different values of attenuation and delay and a different order of placement for the elements within the series path could be used.

The elements of the signal path are connected together using switches such as switch 12 Such switches can be, for example, mechanical relays suitable for use with microwave frequency signals. Switch arm 13 makes contact with either terminal 14 or 15 depending on the value of the input K1. In the following description a low input causes the switch arm to contact the upper terminal 14. When contact is made with terminal 14, attenuation element 17 is connected to the signal path; when contact is made with terminal 15, attenuation element 19 is switched onto the signal path. Other types of switches, such as solid state switches, can be used as will be apparent to those skilled in the art.

A preferred embodiment of the loop simulator provides four modes of altitude simulation: 0 feet, 250 feet, 2000 feet, and 2250 feet. A signal path which simulates zero altitude occurs when all switches are set in the positions shown in FIG. 2. When the test mode is set for a zero altitude simulation, all switch control signals are set low and no delay element is placed in the signal path. As can be seen from FIG. 2, the transmitted test signal passes through coupler 10, switch 12, attenuator 17 (where the signal is attenuated 20 DB), through switches 21, 23, 25, 27, and 29, through variable attenuators 31 and 33, switch 35, and coupler 37. The attenuated signal is output from coupler 37 to the receiver of the radar altimeter being tested.

250 feet of altitude is simulated by changing the states of switches 23 and 25 Thus, a high signal on K3 and K4 reroutes the signal path through delay element 39. In prior art systems delay element 39 would be a 250 foot cable. Cables are bulky, difficult to calibrate, and expensive. Instead of cables, the preferred embodiment uses quartz crystal delay units such as the Teledyne quartz crystal delay, Model #MBE-1014 for delay element 39. These quartz crystals are compact components and are very accurate. Delay unit 39 has a delay time of $0.508 \pm 0.001$ $\mu$sec., which is the exact time it takes an RF radar signal to travel 250 feet, reflect off the earth, and return.

To simulate a 2000 foot altitude, control line K5 on switch 27 and control line K6 on switch 29 are set high. All other switch control lines remain low. This brings delay element 42 into the signal path. Delay element 42 is also a quartz crystal delay unit, but its delay time is set to the time required for a radar signal to travel the loop of a 2000 foot altitude. The preferred embodiment utilizes a Teledyne MBG-1154A, having a delay of $4.065 \pm 0.008$ $\mu$sec. For the 2250 foot simulation, switch 23, 25, 27, and 29 are all energized to bring delay element 39 and delay element 42 into the signal path.

Another test typically performed on a radar altimeter is a receiver/transmitter sensitivity test. To perform this test, the signal path is placed in a mode corresponding to one of the four simulated altitudes, but utilizes variable attenuation elements 31 and 33 in series With the signal path. The attenuation of variable attenuators 31 and 33 can be adjusted until the radar signal at the radar altimeter's receiver has been reduced beyond the level required for valid signal response. This provides a measurement of sensitivity in DB.

In order to incrementally change the attenuation, variable attenuator 31 is preferably a programmable attenuator capable of eight levels of attenuation: 0, 10, 20, 30, 40, 50, 60, 70 Db. The three binary input lines have eight combinations of settings: one for each level of attenuation. The second variable attenuator 33 in the series path has 12 levels of attenuation: 0-9 Db. Four binary input lines, 9PA1-4 set variable attenuator 33 to one of its 12 levels of attenuation equal to the binary value of the input lines. The series combination of variable attenuator 31 and 33 provides the capability for the user to attenuate the test signal by 0-79 Db, with a resolution of 1 Db, in addition to any other attenuation caused by other elements in the signal path.

A test which must be performed on certain pulse altimeters is that of transmitter leakage between antennas. Nominal aircraft antenna isolation between the transmitter and the receiver is in excess of −85 Db. Some operational tests are performed with this −85 Db isolation, but to ensure that the system margin exists for installation degraded antenna leakage, a leakage path simulation of −75 Db is provided to permit a 10 DB safety margin in nominal leakage susceptibility. As seen in FIG. 2, the direct antenna leakage is simulated through a secondary path between coupler 10 and coupler 37. This secondary signal path is placed in parallel with the original delay signal path.

When the loop simulator enters into the antenna leakage test mode, control line K8 and K11 on switches 44 and 50 respectively are energized. This changes the state of the simulated leakage path from an open circuit to a parallel signal path for the radar's test signal. Thus, the radar test signal travels through the delay path which is configured in any one of the four delay states as described above, but additionally, it travels through the simulated leakage path. At the radar altimeter's receiver, the signal received contains a component which has been delayed and attenuated to simulate a specific altitude and loop loss characteristics, and a signal component with no delay and strong attenuation simulating transmitter/receiver cross-talk.

The leakage path has two levels of attenuation. The first is −75 Db, which is selected by switching switch 44 and switch 50, the attenuation being produced from a loss of 20 Db at coupler 10, 20 DB at attenuator 52, 12 Db at attenuator 54, 3 Db from general line loss attenuation, and 20 Db at coupler 37. The second level of attenuation of −85 Db is produced when attenuation element 56 is placed in the series path by switching switch 46 and switch 48.

Measurement of direct antenna leakage is accomplished by terminating the transmit signal directly into a 50 ohm load and activating the leakage path. This is performed by energizing signal line K2 on switch 21 to terminate the transmit signal into the 50 ohm load, and by energizing signal line K8 through K11 to provide the simulated leakage signal.

A further simulation is that of a RF open loop characteristic. The radar test signal passes through coupler 10 and through switch 12 which has signal line K1 energized to allow termination of the transmit signal into the 20 Db attenuator 19. Also, the line connected from coupler 37 to the receiver of the radar altimeter is terminated into a 20 Db attenuator by energizing signal line K7 to switch 35.

Figure 3:
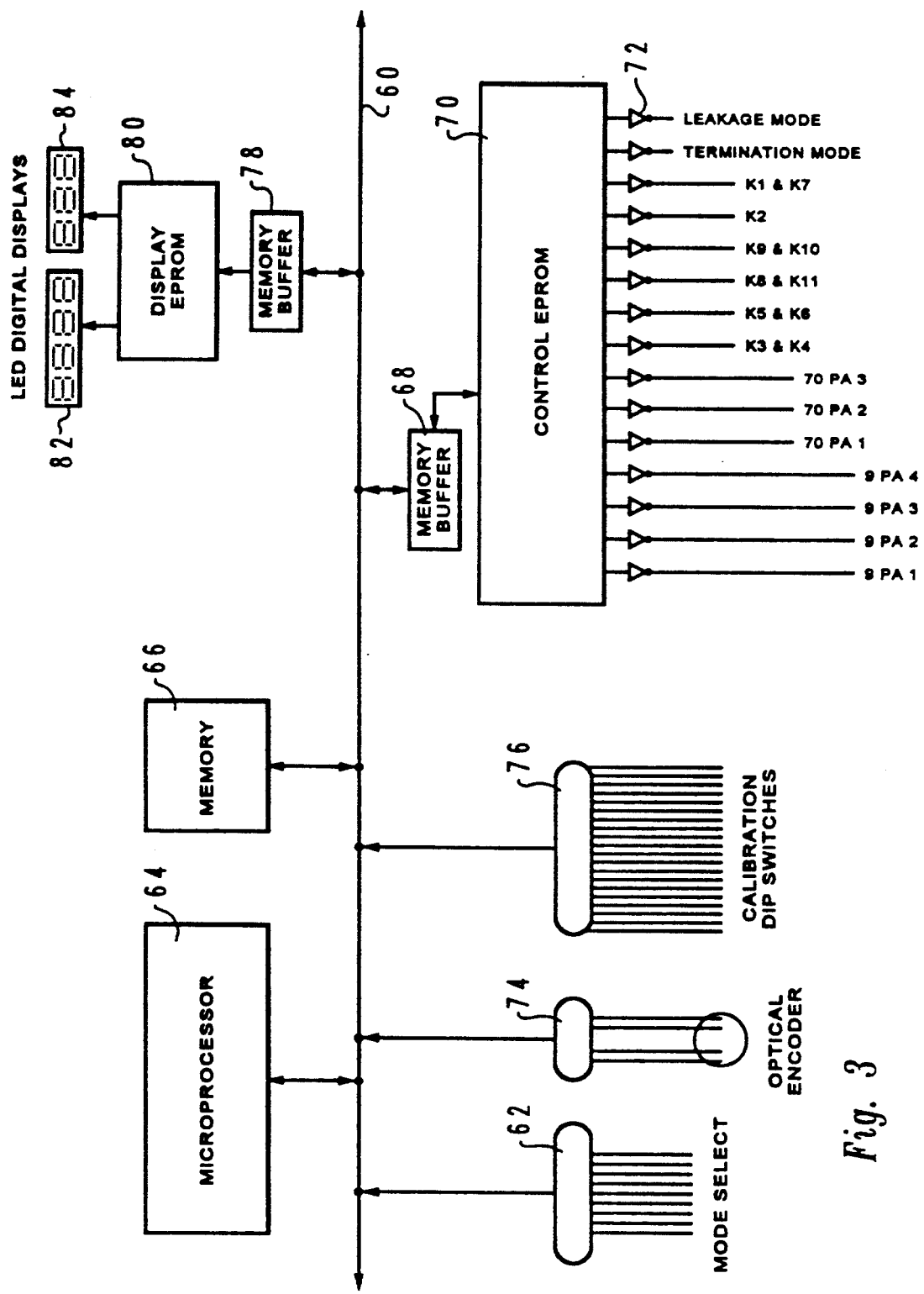
FIGS. 3 is a schematic diagram of the loop simulator's control and display components as described in a preferred embodiment of the present invention.

Referring now to FIG. 3 there is illustrated a schematic diagram of the loop simulator control and display unit 6. The elements linked to communication bus 60 provide user input, output display, and control of the loop simulator signal path 2.

Mode select switch 62 is used to select the desired tests. The user enters the desired mode into the tester through this switch. Switch 62 can be, for example, a sequence of push-button or toggle switches by which the user can select altitude, antennae leakage, and open loop tests. Any type of input selection means which can be read by microprocessor 64 can be utilized for switch 62, as will be apparent to those skilled in the art.

Microprocessor 64 periodically reads the mode selected by the mode select switch 62 over bus 60. When microprocessor 64 determines that the test mode has been changed, it accesses memory 66. Memory 66, in addition to containing the control program for the microprocessor, contains the control data for operation in the various selected modes. Microprocessor 64 sends a mode command on bus 60 to memory buffer 68, which will hold this command until a new command is sent from microprocessor 64. Control EPROM 70 reads the command in memory buffer 68 and converts it into binary signals that are output on its first 15 output pins. These binary signals are connected to the various switches and programmable attenuators through buffers 72, and control the loop simulator signal path.

One implementation of this control function could be a basic address to binary conversion. As an example, the 250 foot altitude simulation is selected as the current test mode. Microprocessor 64 reads this mode from mode select switch 62. Microprocessor 64 accesses memory 66 to retrieve the appropriate mode control command. Microprocessor 64 then sends the mode command to memory buffer 68, which is in turn read by control EPROM 70. The mode command is used as an address into the EPROM to generate output signals to buffers 72. As seen in FIG. 3, this would set all output pins to zero except for the pin labeled K3 and K4 which would be set high. After this high signal is boosted by buffers 72, the line leads to signal line K3 and K4 as illustrated in FIG. 2. As has been explained, this would place the 250 foot delay in the series signal path.

Interface 74 is connected to an optical encoder, which is used to Vary the attenuation of variable attenuators 31, 33. The optical encoder is connected to a shaft, and generates pulses as the shaft is rotated. As known in the art, the direction of rotation can be determined from the pulses, which are typically pairs of pulses in quadrature. As the shaft is rotated, interface 74 generates sequences of signals indicating how far, and in which direction, the shaft is being rotated. The microprocessor 64, in response, changes the value in memory buffer 68. In turn, the outputs to the programmable attenuators are changed to reflect the desired increase/decrease in attenuation.

As the outputs to the programmable attenuators change, the attenuation added to the signal path by these elements also changes. This varies the overall attenuation provided by the signal path, allowing sensitivity of the altimeter receiver to be checked.

Once the simulation mode is selected, the loop simulator displays the simulated altitude and loop attenuation. Microprocessor 64 accesses memory 66 on bus 60 to retrieve the altitude value to be displayed. Because the quartz crystals used for delay elements are precisely calibrated to the altitude simulated, the altitude value retrieved from memory 66 will accurately indicate height corresponding to the actual delay of the loop simulator signal path 2. However, the signal attenuation associated with each mode's signal path will vary from system to system because of attenuation loss in cabling, attenuation elements, switches and delay units which vary in small amounts from similar components used in another system. Because of the small variation in attenuation of the individual elements within the series signal path, the total variations in attenuation of loop simulator signal paths may be significant and requires calibration for each individual system.

Calibration DIP switch 76 provides an input for calibrating loop signal path attenuation. Calibration switch 76 is used to input the attenuation of selected individual elements within the loop simulator signal path. In the preferred embodiment, the DIP switches are set to provide three separate calibration numbers: a lumped value representing attenuation due to switches, cabling, etc. within the test equipment; the attenuation caused by the 250 foot delay line; and the attenuation caused by the 2000 foot delay line. The latter two values are provided by the manufacturer of the delay lines. The switches can be set to the value of the corresponding attenuation, or can be set to a difference between the actual attenuation and a nominal value. The latter approach allows more accurate calibration using a given number of switches through the use of fractional values. Microprocessor 64 determines which of the two delay elements are in series with the loop simulator signal path, based upon the selected mode, and adds that element's attenuation to the zero altitude attenuation to calculate the total loop attenuation to be displayed.

It can be appreciated that this calibration feature of the present invention makes maintenance and reconfiguration of the signal path relatively simple. If one of the components in the signal path, such as a switch, attenuation element, or delay element, is defective and needs replacement, or if different altitude delays or attenuation is desired, the new signal path attenuation can be quickly measured and stored in the calibration switches.

Once determined, the simulated altitude and loop attenuation is displayed. Microprocessor 64 outputs values which are used to address a memory position within display EPROM 80. These values are output on bus 60 and are stored in memory buffer 78. Display EPROM 80 reads these values from memory buffer 78 and converts them into the required output signals to drive 7-segment LED digital displays 82 and 84. Since the altitude is known precisely, and the attenuation is compensated by the calibration switches, both displayed values accurately represent the simulated height and attenuation. When the variable attenuators 31, 33 are varied in response to the optical encoder, the displayed attenuation is varied also.

Figure 4:
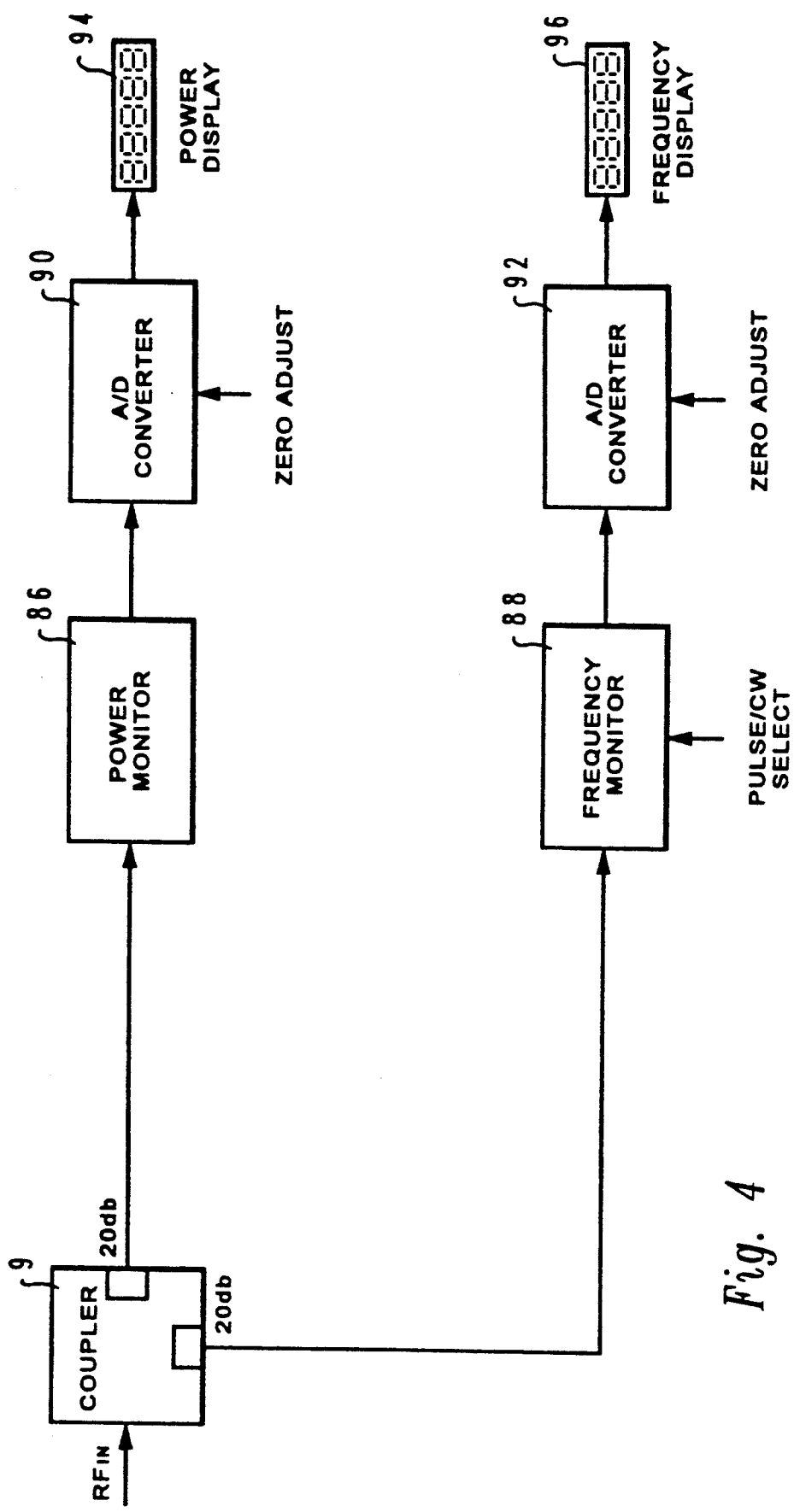
FIG. 4 is a schematic diagram of the power and frequency measuring components as described in the preferred embodiment of the present invention.

Referring now to FIG. 4, details of the power and frequency displays are shown. The radar test signal enters into coupler 9, is attenuated 20 Db, and enters into power monitor 86 and frequency monitor 88.

Power monitor 86 measures the power of the radar test signal and outputs a voltage which represents the power in watts. A-D converter 90 converts this voltage to a digital value which can be displayed on 7-segment LED power display 94.

The radar test signal is also coupled at coupler 9 through a 20 Db attenuation into frequency monitor 88. Known frequency measuring instruments do not allow the input of both a pulse modulated signal or a continuous wave (CW) signal. Because the loop simulator of the present invention can provide delay and an attenuation to either type of input radar test signal, frequency monitor 88 must be able to accommodate either type of signal. To accomplish this, frequency monitor 88 is comprised of two frequency monitors, one for each type of test signal. Pulse/CW select 98 is a signal generated by the microprocessor 64 in response to the mode selection switch. It can be generated by EPROM 70, or another means as desired. The pulse/CW select signal is used to route the test signal from coupler 9 to one or the other frequency measuring device. The measured frequency is output as an analog signal into A/D converter 92, where the signal is converted into a digital output which is read by a 7-segment LED display 96.

Upon reference to the foregoing those skilled in the art will appreciate that the system of the present invention is an automated loop simulator which provides multiple signal paths for providing multiple test modes for a radar altimeter. An RF radar test signal from a radar altimeter is input into the loop simulator signal path where the signal is delayed and attenuated to simulate a selected test mode. Also, the loop simulator signal path has a secondary signal path to simulate leakage power between antennas, as well as various open loop and grounding terminations corresponding to particular test modes for a radar altimeter. The particular loop simulator signal path configuration of delay elements, attenuation and termination is automatically configured through a control system responding to a user selected test mode. Manually controlled variable attenuation is placed in the series signal path to allow radar altimeter sensitivity measurements. Attenuation calibration is provided to ensure that overall signal path attenuation is determined accurately.

While the invention has been particularly shown and described with reference to a preferred embodiment, it will be understood by those skilled in the art that various changes in form and detail may be made therein without departing from the spirit and scope of the invention. For example, the particular control system used to translate user mode inputs into a signal path configuration may be a control system other than the particular microprocessor embodiment shown and described. The switches used in the signal path may be mechanical switches, electrical relays, or semiconductor switches. The particular delay elements used in the preferred embodiment were quartz crystals, but they may be co-axial cable or an electronic delay circuit. As can be seen from these examples, the scope of the present invention is not intended to be limited to the preferred embodiment.

What is claimed is:

1. A loop simulator for testing radar altimeters, comprising:
   a signal path of variable signal delay wherein a signal path attenuation is associated with the level of signal delay;
   a mode control to select a simulation altitude;
   a microprocessor to produce signal values corresponding to a selected mode;
   a control memory to convert the signal values to control signals, wherein the control signals control the signal path delay; and
   a display memory which converts the simulated altitude and signal path attenuation to display signals, and further including a means for displaying the display signals.

2. A loop simulator for testing radar altimeters according to claim 1, further including a calibration control to input a correction factor, and further wherein the microprocessor utilizes the correction factor to determine the signal path attenuation.

3. A loop simulator for testing radar altimeters according to claim 1, wherein the signal path is of variable attenuation and further including an attenuation control to incrementally vary the signal path attenuation in response to input from a user.

4. A loop simulator for testing radar altimeters according to claim 1, further including a second signal path of variable attenuation that is connected in parallel with the signal path in response to the mode control, wherein the attenuation of the second signal path is controlled by the mode control.

5. A loop simulator for testing radar altimeters according to claim 1, wherein the signal path has multiple terminations which are selected via the mode control.

6. A test system for testing radar systems, the test system comprising:
   a plurality of delay elements;
   a plurality of switches for connecting the plurality of delay elements into a series signal path;
   a mode selector for indicating a selected operating mode;
   a controller that, in response to the mode selector, sets the plurality of switches to create a series signal path; and
   a means for displaying signal path attenuation and simulated altitude.

7. A test system for testing radar systems according to claim 6, further including a calibration switch for setting a calibration value, wherein the controller utilizes the calibration value to determine the signal path attenuation.

8. A test system for testing radar systems according to claim 6, further including an attenuation selector and a plurality of variable attenuation elements connected in series with the signal path, wherein the attenuation of the plurality of variable attenuation elements is set in response to the attenuation selector.

9. A loop simulator for testing radar altimeters, comprising:
   a signal path of variable signal delay wherein a signal path attenuation is associated with the level of signal delay;
   a mode control to select a simulation altitude;
   a microprocessor to produce signal values corresponding to a selected mode;
   a control memory to convert the signal values to control signals, wherein the control signals control the signal path delay;
   a display memory which converts the simulated altitude and signal path attenuation to display signals, and further including a means of displaying the display signals; and
   a calibration control to input a correction factor, wherein the microprocessor utilizes the correction factor to determine the signal path attenuation.

10. A loop simulator for testing radar altimeters according to claim 9, wherein the signal path is of variable attenuation and further including an attenuation control to incrementally vary the signal path attenuation in response to input from a user.

11. A loop simulator for testing radar altimeters according to claim 10, wherein the signal path includes a variable attenuation element, and wherein the attenuation control incrementally varies the signal path attenuation by setting the variable attenuation element in response to user input.

12. A loop simulator for testing radar altimeters according to claim 10, further including a second signal path of variable attenuation that is connected in parallel with the signal path in response to the mode control, wherein the attenuation of the second signal path is also controlled by the mode control.

13. A loop simulator for testing radar altimeters according to claim 12, wherein the signal path has multiple terminations which are selected via the mode control.

14. A loop simulator for testing radar altimeters according to claim 9, further including a second signal path of variable attenuation that is connected in parallel with the signal path in response to the mode control, wherein the attenuation of the second signal path is also controlled by the mode control.

15. A loop simulator for testing radar altimeters according to claim 14, wherein the signal path has multiple terminations which are selected via the mode control.

16. A loop simulator for testing radar altimeters according to claim 9, wherein the signal path has multiple terminations which are selected via the mode control.

* * * * *